Figure 4:
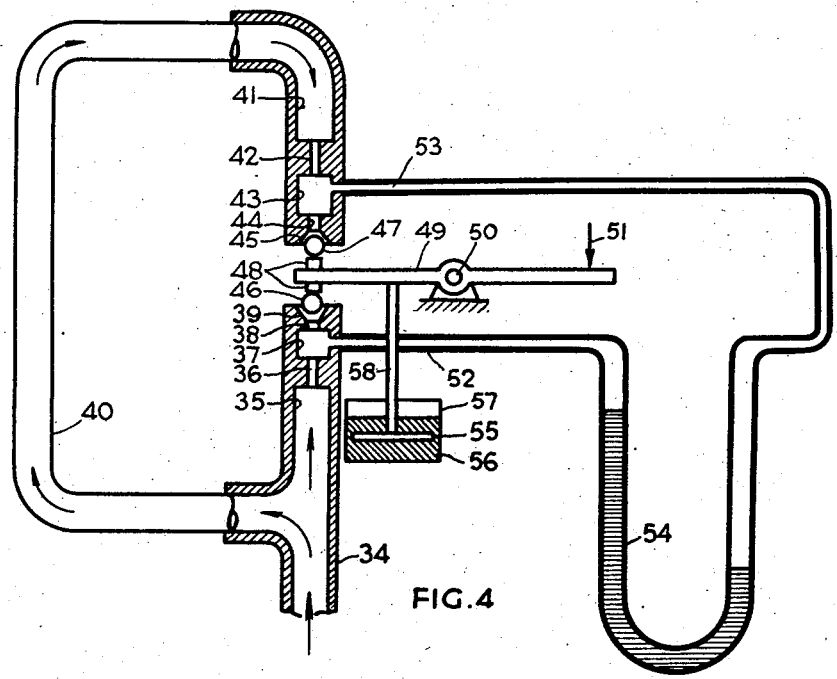

Feb. 16, 1954   G. OLAH   2,669,247
FLUID-PRESSURE OPERATED DEVICE
Filed March 11, 1950   9 Sheets-Sheet 1
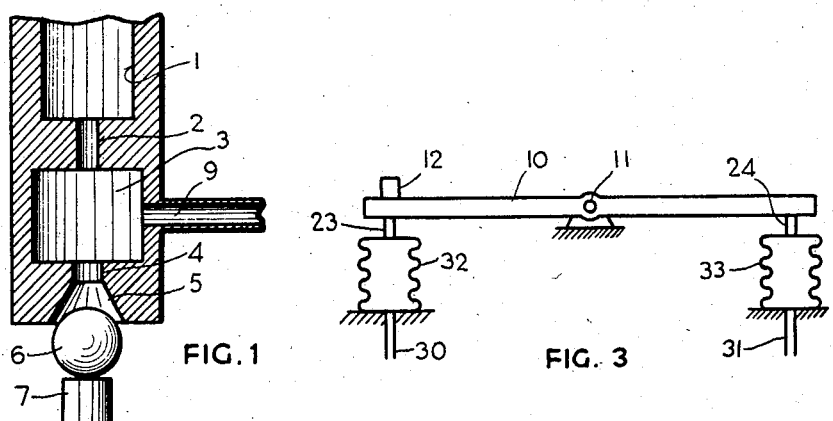
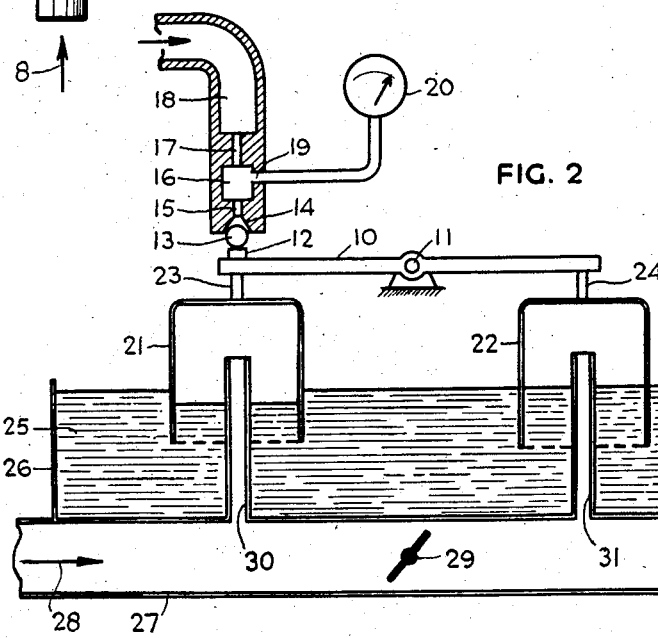
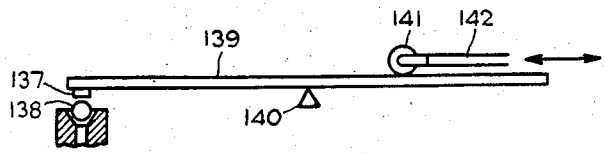
INVENTOR
GEORGE OLAH
BY
Mock & Blum
ATTORNEYS Feb. 16, 1954 G. OLAH 2,669,247
FLUID-PRESSURE OPERATED DEVICE
Filed March 11, 1950 9 Sheets-Sheet 2

INVENTOR
GEORGE OLAH
BY Mock & Blum
ATTORNEYS

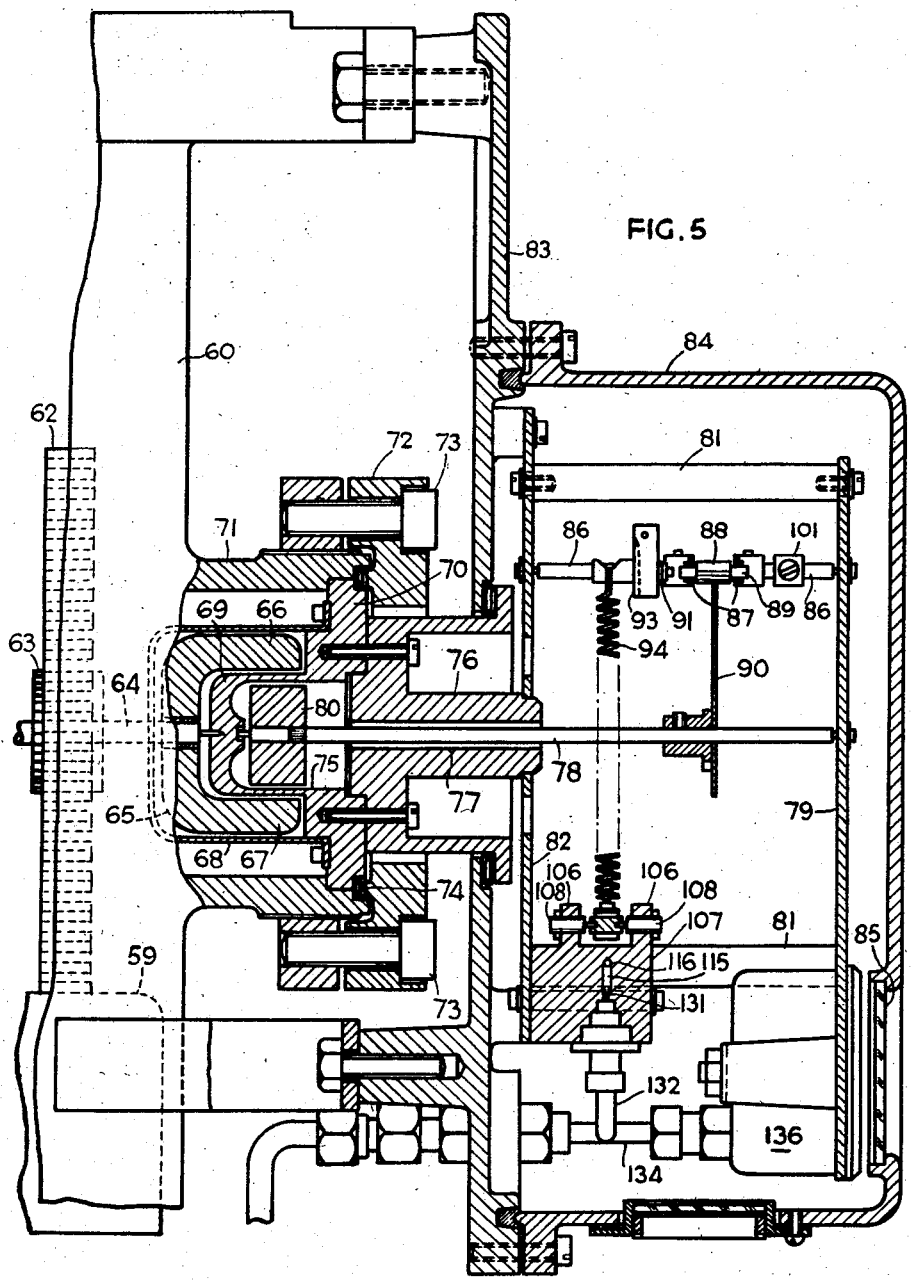

Feb. 16, 1954

G. OLAH 2,669,247

FLUID-PRESSURE OPERATED DEVICE

Filed March 11, 1950

9 Sheets-Sheet 4

INVENTOR
GEORGE OLAH
BY Mock & Blum
ATTORNEYS

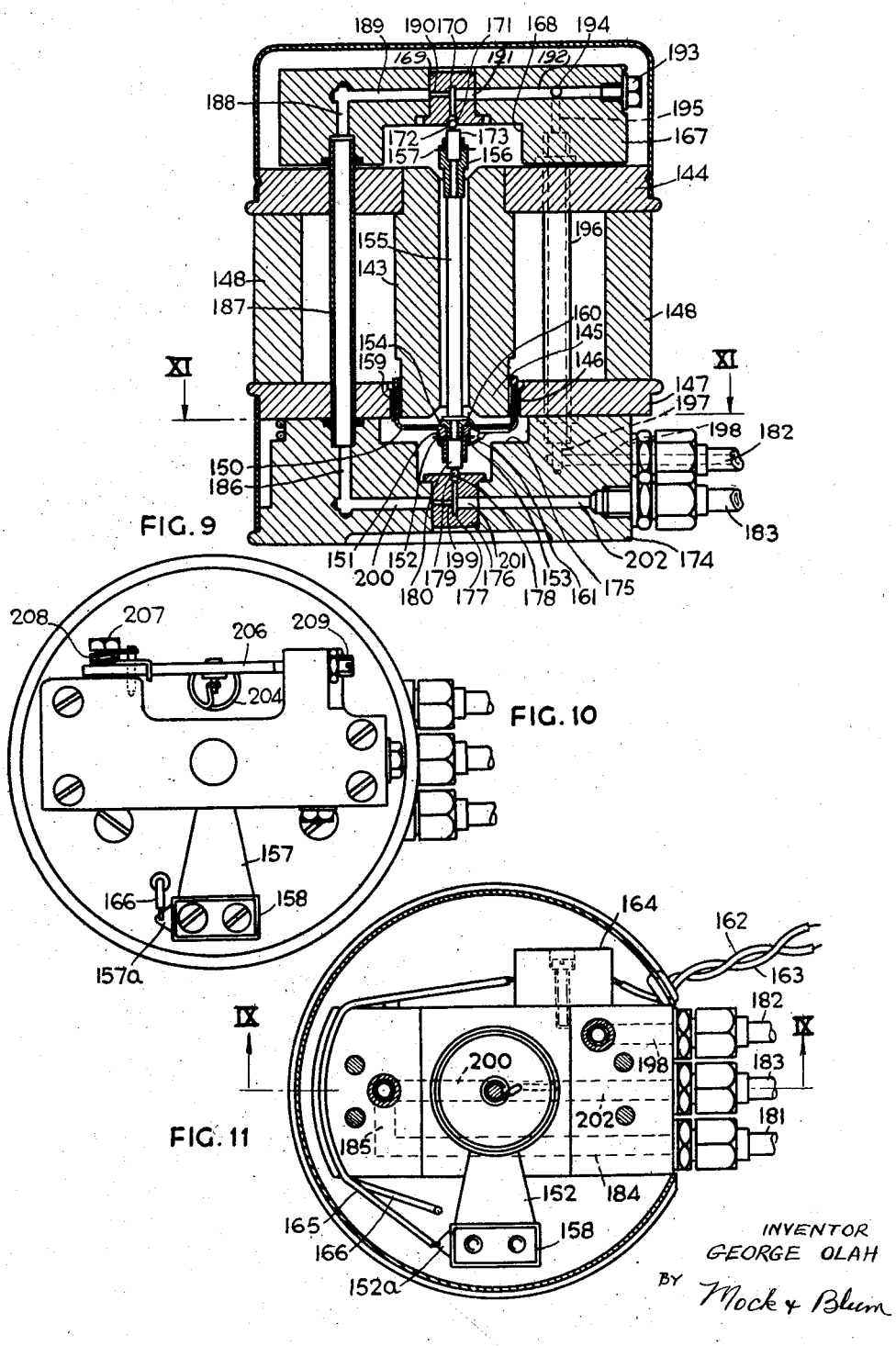

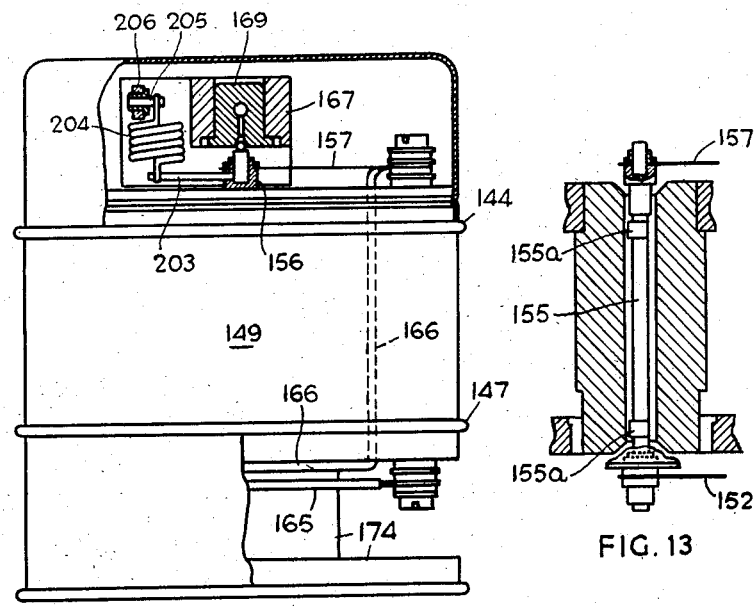

Feb. 16, 1954 G. OLAH 2,669,247
FLUID-PRESSURE OPERATED DEVICE
Filed March 11, 1950 9 Sheets-Sheet 7

INVENTOR
GEORGE OLAH
BY Mock & Blum
ATTORNEYS

Feb. 16, 1954 G. OLAH 2,669,247
FLUID-PRESSURE OPERATED DEVICE
Filed March 11, 1950 9 Sheets-Sheet 8

INVENTOR
GEORGE OLAH
BY Mock & Blum
ATTORNEYS

Feb. 16, 1954 G. OLAH 2,669,247
FLUID-PRESSURE OPERATED DEVICE
Filed March 11, 1950 9 Sheets-Sheet 9
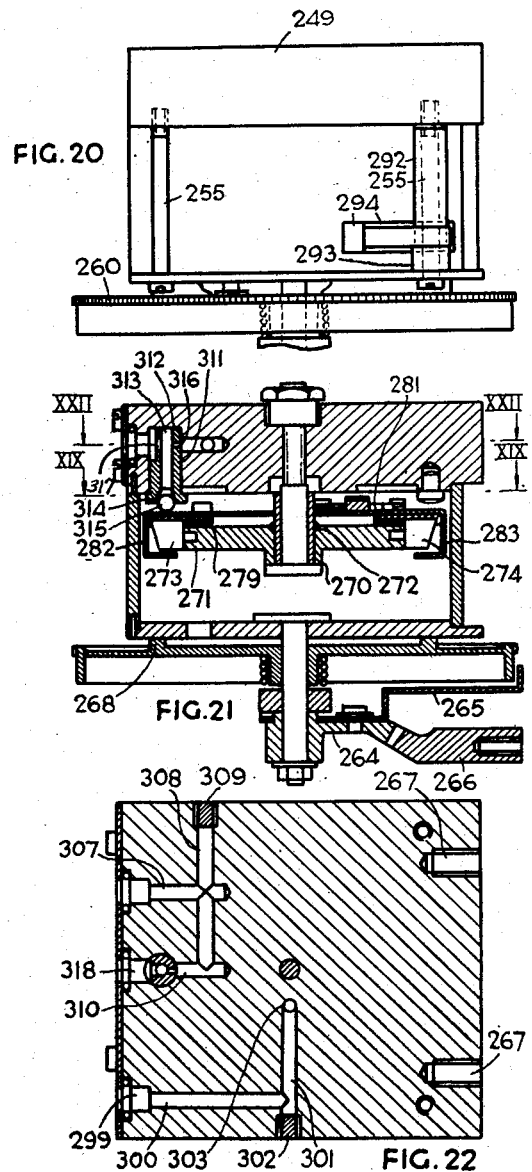
INVENTOR
GEORGE OLAH
BY Mock + Blum
ATTORNEYS Patented Feb. 16, 1954

2,669,247

UNITED STATES PATENT OFFICE 2,669,247

FLUID-PRESSURE OPERATED DEVICE

George Olah, London, England, assignor to Precision Developments Company Limited, London, England, a company of Great Britain Application March 11, 1950, Serial No. 149,050

14 Claims. (Cl. 137—84)

This invention relates to fluid-pressure operated devices and has for its main object to provide means whereby forces of varying magnitudes may be translated into correspondingly varying pressures, or pressure differences, of a fluid medium, which pressures or pressure differences may be utilised for operating measuring, controlling or regulating devices, servo-motors and like fluid-pressure operated devices.

Another object of the invention is the provision of means as just set forth combined with means for converting signals of varying magnitudes, other than forces, e. g. displacements of a member, fluid pressures, electric signals and so on, into forces of varying magnitudes which may then be translated into pressures or pressure differences. Yet another object is the provision of such converting means in a form which will result in a substantial amplification of the power level of the original signals.

According to the present invention, means for varying the pressure of a fluid as a function of the value of a variable force comprises a duct for the fluid having a constriction at a point in its length, means for maintaining the fluid at a predetermined pressure in a portion of the duct at one side of the constriction, an opening for establishing communication between the portion of the duct at the other side of the constriction and a space containing fluid maintained at a pressure differing from the predetermined pressure, a coned valve seating disposed around the opening and having the included angle of the conical surface relatively small, a ball valve co-operating with the seating and urged away from the same under the action of the higher of the two pressures already referred to, and means for applying the variable force to the ball in the sense for urging it into sealing contact with the coned seating.

Figure 7:
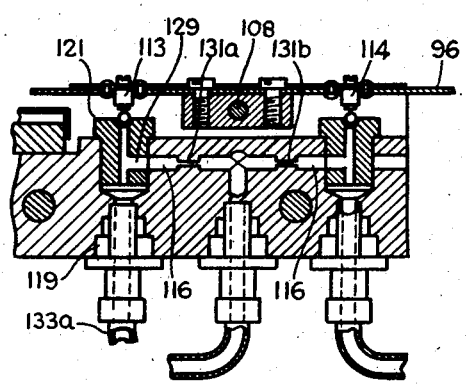
Figure 6:
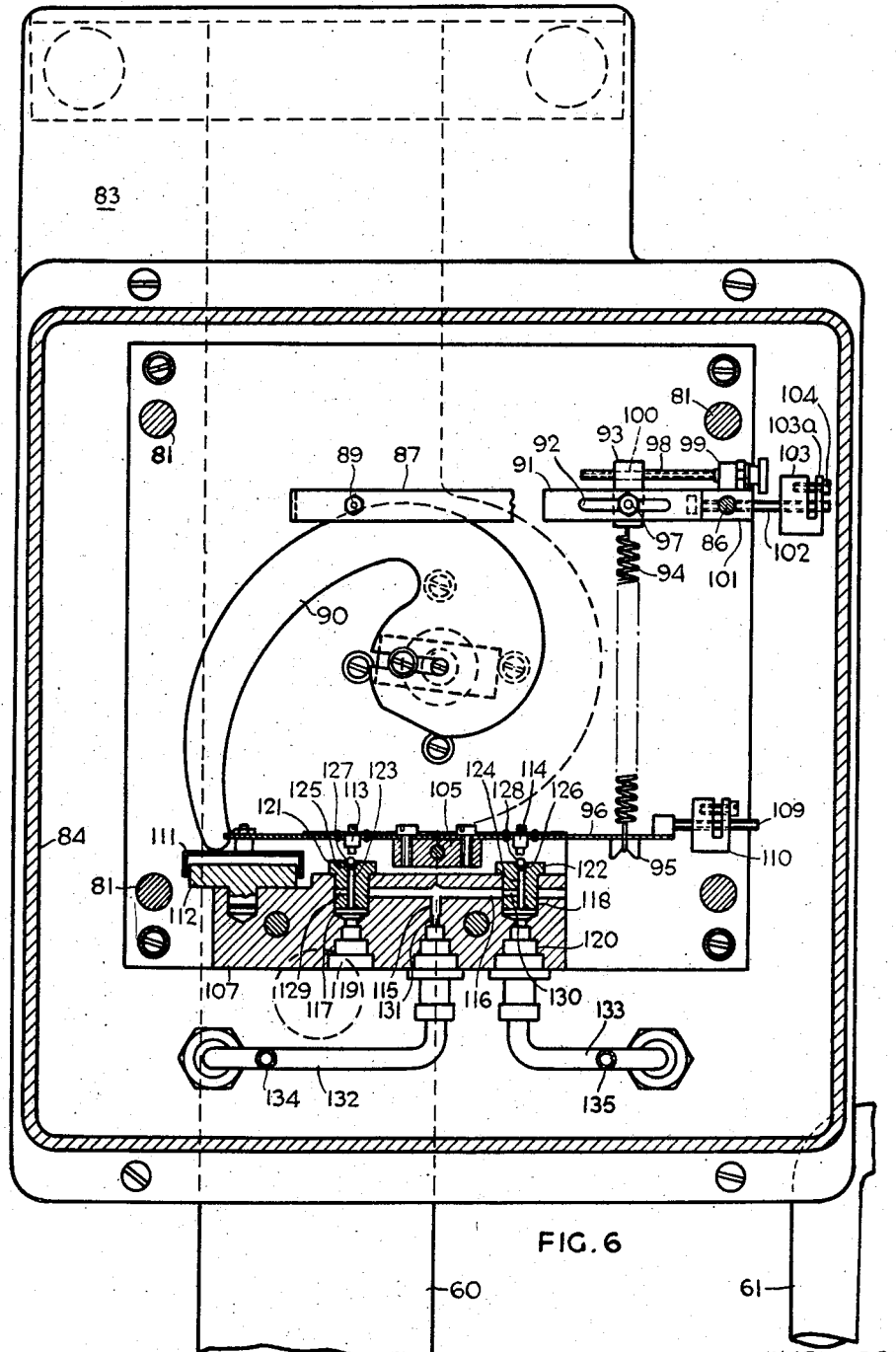

In order that the invention may be clearly understood, there will now be described various examples of the way in which it may be carried into effect, reference being made to the accompanying drawings wherein:

Fig. 1 is a fragmentary sectional elevation of the basic device according to the invention, Fig. 2 is a somewhat diagrammatic sectional elevation illustrating one manner in which this device may be employed in practice, Fig. 3 is a fragmentary detail view of part of Fig. 2 illustrating a modification, Fig. 4 is a somewhat diagrammatic sectional elevation showing two of the devices according to the invention arranged in opposition in order to produce a pressure differential proportional to a force to be measured, Fig. 5 is a sectional side elevation of an apparatus embodying the invention and intended to produce a pressure proportional to a rate of flow, Fig. 6 is a front elevation of this apparatus with some parts shown in section, Fig. 7 is a fragmentary view of part of the apparatus shown in Fig. 6 as modified for producing a pressure difference proportional to the rate of flow to be measured, Fig. 8 is a diagrammatic sectional elevation illustrating one means which may be employed for converting a displacement into a force which is to be employed in the apparatus of the invention for producing a proportional fluid pressure, Fig. 9 is a section taken on the line IX—IX of Fig. 11 and showing a device for converting an electric signal into a force and then into a proportional pressure difference, Fig. 10 is a plan view of the apparatus with the top cover removed, Fig. 11 is a section taken on the line XI—XI of Fig. 9.

Figure 15:
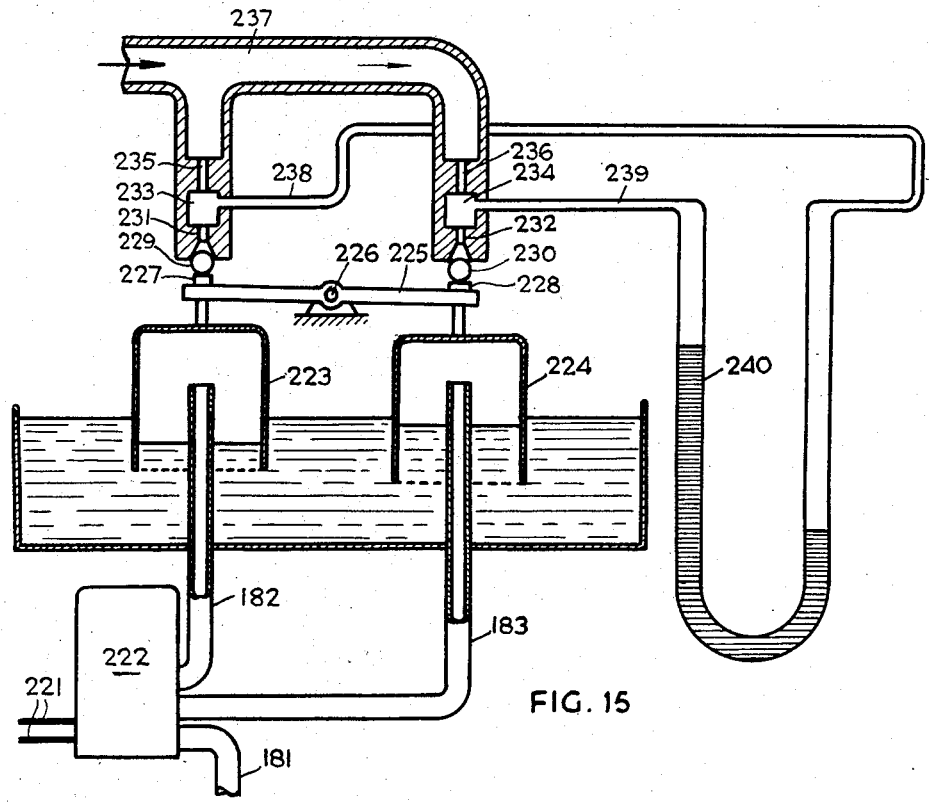
Figure 16:
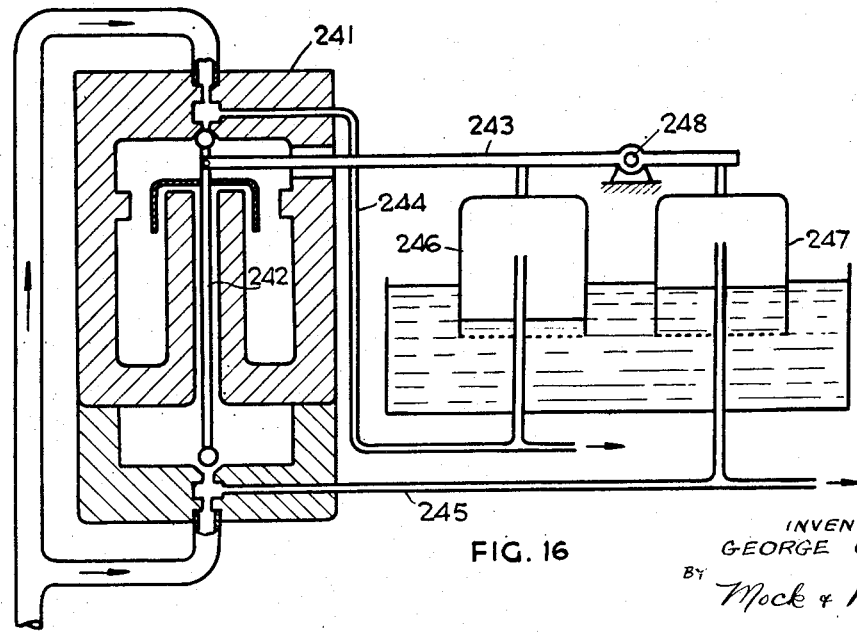
Figure 17:
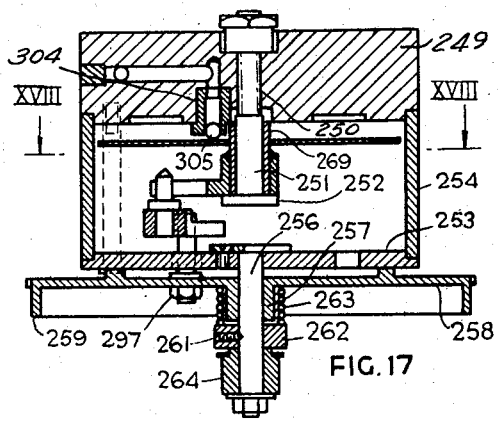
Figure 18:
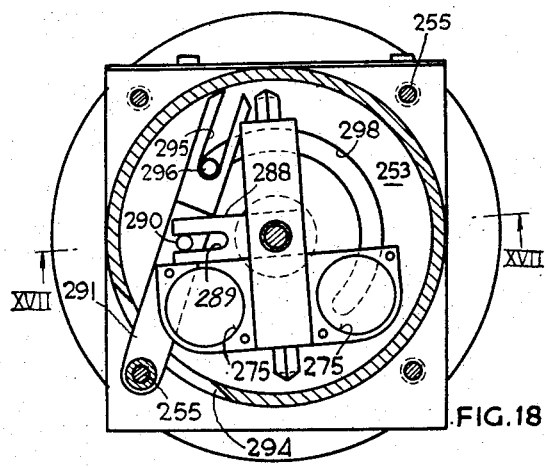
Figure 19:
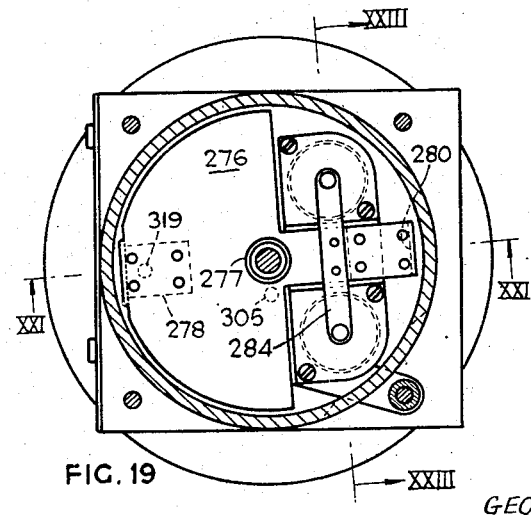

Fig. 12 is an elevational view taken from the left of Fig. 9 with parts broken away and other parts shown in section, Fig. 13 is a fragmentary sectional view showing a part of the apparatus illustrated in Fig. 9 with a modification, Fig. 14 is a diagrammatic view illustrating means for converting a displacement into an electric signal which is to be converted in an apparatus according to Figs. 9–12 into a proportional pressure difference, Fig. 15 is a diagrammatic sectional elevation illustrating the manner in which two of the devices for producing a proportional pressure difference in accordance with the invention may be connected in cascade, Fig. 16 is a diagrammatic sectional elevation illustrating a device according to the invention provided with feed-back means, Fig. 17 is a section taken on the line XVII—XVII of Fig. 18 and showing a device utilising the basic means according to the invention in order to produce a pressure having a predetermined but variable relationship to a control pressure, Fig. 18 is a section taken on the line XVIII—XVIII of Fig. 17, Fig. 19 is a section taken on the line XIX—XIX of Fig. 21, Fig. 20 is an elevational view, with a part broken away, taken from the left of Fig. 17, Fig. 21 is a section taken on the line XXI—XXI of Fig. 19, Fig. 22 is a section taken on the line XXII—XXII of Fig. 21, and Fig. 23 is a fragmentary section taken on the line XXIII—XXIII of Fig. 19.

Referring first of all to Fig. 1 which illustrates the basic device according to the invention, 1 indicates a duct through which a gaseous fluid is supplied at a predetermined pressure to a restricted orifice 2 which delivers into a chamber 3 having an outlet at 4. The outlet is flared to constitute a coned valve seating 5 with which is adapted to co-operate a ball valve 6 which is supported by an abutment 7 to which a variable force is adapted to be applied in the direction indicated by the arrow 8. Into the chamber 3, there opens an outlet passage 9 leading to a pressure responsive device (not shown).

In the example considered, the pressure of the gaseous fluid supplied through the duct 1 is higher than the atmospheric pressure, the outlet end of the valve seating 5 being in communication with the ambient air.

The pressure in the chamber 3 when the outlet opening 4 is closed by the ball valve 6 being urged into contact with the seating 5 under the action of the force applied to the abutment 7, assuming that the pressure responsive (or pressure actuated) device connected to the outlet passage 9 does not consume any pressure fluid, is equal to the predetermined pressure maintained at the other side of the constriction 2 in the duct 1. When the ball valve 6 is fully open, making the same assumption, the pressure in the chamber 3 is a minimum and for intermediate positions of the ball the pressure lies between the maximum and minimum values mentioned. In a practical example, the pressure maintained at the predetermined value in the duct 1 is a super-atmospheric pressure, the space with which the valve controlled opening 5 communicates is the room or the like in which the apparatus is set up and the ball valve is such that when fully open the resistance it offers to the flow of fluid through the opening 4, 5, is one-ninth of the resistance to the flow of the fluid through the constriction 2. In this case, the minimum pressure in the chamber 3 is one-tenth of the predetermined super-atmospheric pressure prevailing in the duct 1.

Should the pressure responsive device connected at the passage 9 consume pressure fluid, the maximum pressure obtainable in the chamber 3 feeding the same will be reduced to a degree depending upon the external resistance of this device and if the latter can feed fluid back into the chamber 3, the minimum pressure obtainable therein will be increased. In other words, the extreme or saturation values of the means according to the invention will be brought closer together. Nevertheless, any value for the pressure in the chamber 3 intermediate these saturation values can be obtained for appropriate positions of the ball valve 6 between fully closed and fully open.

It will be understood that the fluid under pressure seeking to flow from or into the chamber 3 fitted with the valve controlled opening 4, 5, by way of the latter produces a force acting on the ball 6 which tends to open the valve. Should this force be smaller than the instant value of the variable force applied to the abutment 7 in the direction indicated by the arrow 8, the latter force urges the ball 6 towards its seating 5 so that the fluid pressure acting on the ball will increase in value. When a position of equilibrium is reached, the pressure in the chamber 3 is proportional to the value of the variable force, the ratio of pressure to force being constant and independent both of the predetermined pressure maintained in the duct 1 and of the rate of consumption of pressure fluid by the pressure responsive device connected at the outlet passage 9, provided that the proportional pressure is within the saturation values referred to above.

In order to get the best results, the included angle of the conical surface of the coned seating 5 for the ball 6 should be relatively small, that is to say, in the range of 20° to 40°. The preferred angle is 30°.

In order for the ratio of pressure to force to be constant, it is necessary that the effective area of ball 6, acted upon by the pressure in chamber 3, be substantially constant. It has been found in practice that this requirement is met to a high degree of accuracy when the included angle of seat 5 is in the range of 20° to 40°, preferably 30°. If the angle is too small, the ball can sometimes jam in the seat. If the angle is too big, the flow of air through the gap between the ball and the seat becomes turbulent and unstable instead of laminar, resulting in more or less random fluctuations of air flow.

Where the variable force may assume both positive and negative values, it is preferred to employ two of the means according to the invention and to arrange that the variable force acts on both balls, but in opposite senses on each of them. The pressure difference between the two ducts fitted with the valve controlled openings, which pressure difference may assume a positive or negative value, is then proportional to the value of the variable force. A simple arrangement of this character will be described with relation to Fig. 4, for example.

Such an arrangement has an inherent negative damping which makes it oscillatory and makes it difficult, if not impossible, to secure equilibrium conditions with a linear relationship between force and pressure over the whole range. This negative damping may, however, be compensated for and the arrangement stabilised by the provision of positive damping means acting on the part or member through which the variable force is applied to the ball valves, see for example Fig. 4. Suitable damping means include dash-pots as shown in Figs. 4 and 6 or eddy current devices such as metal elements located in the field of a magnet (as shown for example in Fig. 9). When such damping is applied, the oscillation of the arrangements referred to can be prevented and a substantially linear relationship between the variable force and the pressure difference produced may be secured.

Without the positive damping, the arrangement may be used as an oscillator for producing fluid pressure pulses. It has been found that the relationship between the variable force and the mean pressures produced in the arrangement is linear at both ends of the full control range but that the slope is reversed near the zero point. A response of this character can be employed for operating controls having a "snap-over" action.

Various examples of the way in which the invention may be utilised in practice are illustrated in the accompanying drawings and will now be briefly described.

In the example shown in Fig. 2, the variable force which is to be converted into a fluid pressure is applied to a lever 10 which is pivoted on a fixed support at 11 and has secured thereon at one end an abutment 12 for operating upon a ball valve 13. The ball valve is a free ball adapted to seat in the conical mouth 14 of a duct 15 leading into a chamber 16 which is supplied at the opposite end through a restricted orifice 17 from a source of compressed air (not shown) by way of a duct 18 and has an outlet 19 leading to a device capable of responding to fluid pressure. Such a device in its simplest form may be a pressure gauge 20, as shown in Fig. 2, of the indicating or recording type but it is to be understood that the device may also be a servo motor or the like. It is convenient to arrange the terminal portion of the duct 18 with its axis vertical and to have the conical mouth 14 at the lower end of the chamber 16 as illustrated, the included angle of the cone generally being about 30°. The ball 13 rests on the abutment 12 and the variable force is applied to the lever 10 in the sense for causing the abutment to urge the ball into sealing engagement with the conical seating 14.

The example illustrated is adapted to derive the variable force from a pressure which is of small magnitude such as may be encountered, for example, in draught control apparatus. Two bells 21 and 22 are fixed one at each end of the operating lever 10, by rods 23 and 24 respectively, and dip by their lower edges into a body of liquid 25 contained in a suitable tank 26 and forming a liquid seal for the lower ends of the bells. 27 indicates a passage through which a gaseous fluid flows in the direction indicated by the arrow 28, a controlling or butterfly valve 29 being located in the passage to control the flow of the gaseous fluid through the latter. The space within the bell 21 is placed in communication with the interior of the passage 27 at a point in advance of the valve 29 by way of a duct 30, whereas the space within the bell 32 is placed in communication with the passage 27 at a point at the rear of the valve 29 by way of a duct 31. The pressure difference between portions of the passage 27 at opposite sides of the valve 29 is of small magnitude, as will be understood. However, these pressures acting on the bells 21 and 22 produce a variable resultant force on the lever 10 which in turn operates through the abutment 12 upon the ball valve 13 to cause the production in the passage 19 leading to the pressure gauge 20 of a pressure proportional to the value of the variable force.

In the operation of this device, air at a predetermined pressure is supplied through the duct 18 to the inlet end of the restricted orifice 17 and a pressure builds up within the passage 19 leading to the pressure gauge 20. When the pressure of the air in the passage reaches a certain value, the ball is urged away from its seating due to the fact that the downward force exerted on the ball overcomes the upward force exerted on the ball due to the action of the variable force applied to the lever 10. As the ball leaves its seating 14, the air under pressure in the passage 19 is released with a consequent drop in the pressure in the passage. Consequently, a position of equilibrium is reached and the ball is maintained at a distance from its seating such that the pressure prevailing in the passage 19 and chamber 16 is proportional to the value of the variable force acting on the lever 10. It is a simple matter with an arrangement of this character to produce in the passage leading to the pressure gauge a pressure which is several hundred times the pressure difference which is available in the passage 27.

It will be understood that a similar arrangement may be employed where the pressures to be measured or recorded are relatively high. In this case, see Fig. 3, the bell-type pressure detectors may be replaced by detectors 32 and 33 of the bellows or Bourdon tube type. As the full range of displacement of the ball valve 13 is extremely small, the corresponding displacements of the pressure detectors 32 and 33 are also small so that the influence of the elastic properties of the materials from which the detectors are constructed, upon the accuracy of the result becomes negligible.

In the example so far described, it has been a question of converting a variable force into a proportional pressure, but it is also possible to convert a variable force into a proportional pressure difference, this being of particular importance in the case where the force may assume both positive and negative values. A simple example of apparatus for this purpose is shown in Fig. 4, where two apparatus, each identical with that shown in Fig. 1, are arranged in opposition. In this case, compressed air is supplied by way of a pipe 34 to one apparatus comprising a duct 35, restricted orifice 36, chamber 37 and outlet 38 with conical seating 39 and a branch pipe 40 from the pipe 34 supplies the compressed air to the other apparatus comprising a duct 41, restricted orifice 42, chamber 43 and outlet 44 with conical valve seating 45. A ball 46 is provided to co-operate with the seating 39 and another ball 47 is provided to co-operate with the seating 45, a single abutment 48 being disposed between the two balls to act upon each of them at the same time. This abutment is carried at one end of a lever 49 which is pivoted on a fixed support at 50 and is adapted to have the force to be measured applied to its other free end as indicated by the arrow 51. The chambers 37 and 43 have outlet passages 52 and 53 respectively which communicate with the appropriate ends of a U-tube manometer 54. For the reasons mentioned above, a positive damping device is provided in association with the lever 49, this being shown diagrammatically as a disc or paddle 55 arranged to work in a body 56 of liquid held in a container 57, the disc or paddle being connected to the lever 49 by means of a rod 58.

It will be seen that the one ball valve 46 is oppositely located to the other 47, that is to say, so that axial movement of the abutment 48 will permit one ball valve to move away from its seating while urging the other ball valve onto its seating. When a pressure is exerted upon the lever 49 in the direction indicated by the arrow 51, the abutment 48 tends to move upwards and this movement is assisted by the pressure acting upon the ball valve 46 and resisted by the pressure acting upon the ball valve 47. It will be understood that an equilibrium position may be reached in which the difference between the pressures in the two passages 52 and 53 is proportional to the value of the force applied at 51, instead of being connected to a pressure responsive device of the character indicated, the passages 52 and 53 may be arranged to supply the opposite ends of a double-acting cylinder of a servomotor or be connected to some other pressure-actuated device.

The examples which have been described above have been of pressure-to-pressure conversion but it is also possible to have displacement-to-pressure conversion arrangements. For example, an element which is subject to a variable degree of displacement may be connected to one end of a resilient member, the other end of which is connected to an abutment for operating upon the ball valve or valves of an arrangement such as has been described. In this way, displacement of the element is utilised to produce a force acting upon the ball or balls which is proportional to the displacement of the element.

A practical construction of such an arrangement is illustrated in Figs. 5 and 6. In this case, the displacement to be converted is that of a float 59 supported by the mercury (not shown) in one leg 60 of a mercury manometer tube, part of the other leg of which is shown at 61 in Fig. 6. As shown in Fig. 5 the float 59 has secured thereon a rack bar 62, the teeth of which are in mesh with those of a pinion 63 secured on a spindle 64 which is suitably supported for rotation and carries at one end a U-shaped permanent magnet 65, the poles 66 and 67 of which are located in the annular gap between the interior surface of a sheet metal housing 68 and the external surface of a re-entrant cup-shaped portion 69 of a closure member 70 secured in the open end of a branch 71 extending from the tube 60 somewhat to one side of the axis thereof. The closure member 70 is held in place by a suitable clamping ring 72 and bolts 73 with the interposition of a packing ring 74 so that the end of the branch 71 is closed in a pressure-tight manner. Over the open end of the recess 75 in the closure member 70 is secured a guide element 76 having a central axial bore 77 through which extends with some clearance a spindle 78 which is rotatably mounted at one end in the inner end wall of the recess 75 and at the other end in a front plate 79. Within the recess 75, this spindle 78 has secured thereon a bar 80 of magnetic material which is disposed between the poles 66 and 67 of the magnet 65. It will be understood that the re-entrant portion of the closure member 70 is of non-magnetic material with the result that any rotation of the magnet 65 about the axis of the spindle 64 will cause a corresponding rotation of the bar 80 with the spindle 78 which is secured thereto.

The front plate 79 is supported by suitable spacer members 81 from a rear plate 82 which is in turn secured to a base member 83 supported from the tube 60 in the manner indicated. A removable cover 84 having an inspection opening covered by a glass window 85 is secured on the base member 83. A spindle 86 is rotatably mounted between the plates 79 and 82 to extend parallel with the spindle 78 and has secured thereon a lever 87 of bifurcated construction which has a roller 88 rotatably mounted upon a spindle 89 that extends between the two limbs of the lever 87 towards the free end of the latter. There is secured on the spindle 78 a cam 90 shaped according to the square root law and adapted to support by its edge the roller 88 carried on the lever 87.

Also secured on the spindle 86 is a further and shorter lever 91 which is formed towards its free end with a longitudinally extending slot 92 along which may be adjusted an anchoring block 93 for one end of a helical tension spring 94, the other end of which is anchored to a block 95 carried near one end of a balanced lever 96 to be referred to below. The anchor block 93 has a stud 97 extending laterally therefrom and slidably engaged in the slot 92, the block being retained on the lever 91 by a nut screwed on the end of the stud. Adjustment of the block 93 along the length of the lever 91 in order to vary the lever arm at which the force due to the spring may be applied is effected by means of a screw-threaded spindle 98 which is rotatably but non-displaceably mounted in a block 99 secured on the spindle 86 and has its screw-threaded end threadedly engaged in a correspondingly screw-threaded aperture 100 formed in the anchor block 93. For zero adjustment purposes, there is secured in a block 101 mounted on the spindle 86 a screw-threaded spindle 102 projecting beyond the spindle 86 to receive an adjustable weight 103 which is adapted to be screwed along the spindle 102 as required and then to be locked in position by tightening a screw 104 in order to draw a thin end portion 103a of the weight 103 towards the main body of the latter and thereby to cause the screw-threads in the two portions of the weight to bind frictionally upon the screw-threads of the spindle 102.

Referring now to the balanced lever 96, this is provided at the centre of its length with a block 105 by which it is pivotally mounted between a pair of upstanding lugs 106 formed on a block 107 which is secured to the lower edge of the rear plate 82. The pivots for the lever 96 are shown at 108 in Fig. 5. At the end adjacent to the block 95 to which the spring 94 is anchored, there is attached to the lever a projecting screw-threaded spindle 109 upon which is adjustably mounted a balance weight 110 adapted to be adjusted and locked in position in the same way as the weight 103, 103a already referred to. At the opposite end of the lever 96 is secured a cup-shaped member 111 which is adapted to work with slight clearance over a disc 112 secured in the adjacent end of the upper face of the block 107. The parts 111 and 112 co-operate to constitute an air dash-pot. Also mounted on the lever, one at each side of the pivotal axis of the latter, are two abutment members 113 and 114 which are adapted to co-operate with ball valves of two arrangements substantially in accordance with Fig. 1 which are mounted in the block 107.

This block is formed with a vertical bore 115 leading from its lower face into a horizontal bore 116 which is intersected at either side of the bore 115 by a vertical bore 117 or 118, opening into the upper face of the block 107 and leading at its lower end to a stepped passage 119 or 120 respectively which opens into the bottom face of the block. In each of the bores 117 and 118 there is secured a cylindrical plug 121, or 122, respectively, having an axial bore 123, or 124, which is formed at its upper end with a conical seating 125, or 126, adapted to receive a ball valve 127, or 128, co-operating respectively with the abutments 113 and 114. Each plug 121 or 122 is formed with a radial bore 129 or 130 at a level such that it can be brought into register with the horizontal bore 116 when the plug is fixed in position. When, as is the case in the example shown in Fig. 6, the apparatus is intended to produce as an output a proportional pressure, only one of the plug and ball valve combinations is rendered operative. Consequently, the plug 121 is shown positioned with the radial bore 129 turned out of register with the bore 116, whereas the plug 122 has its radial bore 130 disposed in register with the bore 116 to establish communication between the latter and the axial bore 124 in the plug. In this case the restricted orifice necessary for the purposes of the invention may be arranged in the bore 115 as shown at 131 in Fig. 6. A supply pipe for compressed air is shown at 132 for feeding the air to the restricted orifice 131 and thence to the bores 115 and 116. Similarly, in the stepped passage 120 there is secured the end of an outlet pipe 133 by way of which the proportional pressure produced in the apparatus may be led away to a point at which it is to be utilised, for example, to a fluid pressure operated device adapted to control the rate of flow being measured by the manometer 60, 61 or to produce at a distant point an indication of such rate of flow. It is preferred, as indicated in Figs. 5 and 6, that branch pipes 134 and 135 be connected to the pipes 132 and 133 respectively, these branch pipes being connected to pressure responsive devices (of which one connected to the pipe 134 is indicated at 136 in Fig. 5) mounted in apertures in the lower end of the front plate 79 so that the indication produced by the device in question may be observed through the window 85.

In the operation of the apparatus illustrated in Figs. 5 and 6, the float 59 rises or falls in accordance with the changes in the rate of flow being measured in the mercury manometer 60, 61 and through the rack 62 and pinion 63 causes appropriate rotation of the magnet 65. The poles 66 and 67 of this magnet, by their influence on the bar 80, cause a corresponding rotation of the spindle 78 with the cam 90 so that the free end of the lever 87 will be raised or lowered accordingly. In consequence, the spring 94 will be tensioned to a greater or lesser degree and will thus vary the force applied to the balanced lever 96 at the location of the anchor block 95. Consequently, the abutment 114 will co-operate with the ball 128 in order to ensure that a pressure proportional to the displacement of the float 59 will be maintained in the pipes 133 and 135. It will be seen that the displacement of the float 59 is utilised to produce a force acting upon the ball 128 which is proportional to the displacement of the float.

It will be understood that the weights 103 and 110 may be moved along the screw-threaded spindles 102 and 109 in order to adjust the apparatus, for example, in order to adjust the zero setting thereof. Adjustment of the anchor block 93 for the upper end of the spring 94 may be utilised in order to vary the ratio of the transmission from the cam 90 to the balanced lever 96 and the air dash-pot 111 and 112 provides, as will be understood, the necessary positive damping.

When, as in some cases is desired, it is preferred that the output of the apparatus be a differential pressure proportional to the displacement of the float 59, the apparatus may be modified in the sense indicated in Fig. 7. Corresponding parts in this figure are given the same reference numerals as in Fig. 6. It will be seen that both abutments 113 and 114 on the balanced lever 96 are here operative since the plug 121 has been turned about its axis through 180° in order to bring its radial bore 129 into register with the corresponding end of the horizontal bore 116. Since now both devices are operative, the constriction 131, shown in Fig. 6, is removed from the bore 115 and separate constrictions 131a and 131b are provided in the bore 116 at either side of the junction of the latter with the vertical bore 115. In addition, an outlet pipe 133a is secured in the stepped aperture 119 which communicates with the bore receiving the plug member 121. The manner of operation of the apparatus as thus modified will be clearly understood without further description.

Another method of securing displacement-to-pressure conversion is diagrammatically shown in Fig. 8. In this case, the abutment 137 for acting upon the ball valve 138 of a basic device, such as is illustrated in Fig. 1, is carried by a lever 139 which is pivoted at 140 and has a sliding or rolling weight member 141 mounted on its upper surface and adapted to be displaced by means of a connection 142 in one or other of the directions indicated by the arrows. By means of the connection 142, the weight member 141 is operatively connected to a displaceable element, the movements of which are to be converted into a proportional pressure. It will be clear that any displacement of the element will move the weight member 141 along the lever 139 to produce a corresponding variation of lever arm ratio and thereby a corresponding variation in the force which is applied to the ball 138 by the abutment 137.

The invention may also be utilised for the conversion of electric signals to a proportional pressure or pressure difference. For this purpose, the electric signals may be fed into the winding of a solenoid or, as is preferred, into the winding of a moving coil disposed in a magnetic field, the arrangements being such that the electric signals are utilised to produce a force proportional thereto, which force may then be applied to the ball valve of an arrangement such as is shown in Fig. 1 or to the two ball valves of an arrangement such as is shown in Fig. 4. A practical example of an arrangement of the latter character is illustrated in Figs. 9 to 12.

In these figures there is shown a pot-type permanent magnet composed of a central tubular core 143 of soft iron secured at its upper end in an aperture in a top member 144 and having its lower end 145 constituting a pole piece located with adequate clearance in an aperture 146 formed in a bottom member 147. The top and bottom members 144 and 147 are connected by an annular member 148 of permanently magnetised material, thus forming a complete circuit for the magnetic flux which traverses the annular air gap between the pole piece 145 and the wall of the aperture 146.

There extends within the annular air gap the cylindrical skirt portion of a cup-shaped former 150 formed from a high conductivity metal, such as copper, and provided on its lower end face with a central tubular extension or bush 151 having a reduced diameter outer end which is secured in an aperture in a flat resilient strip 152 by means of a collar 153 secured on the reduced diameter portion of the bush 151. Within the inner end of the aperture through the bush 151 is engaged a bush 154 of insulating material within which is engaged as a close fit the reduced end of a spindle 155 which extends axially with clearance through the bore in the central core piece 143.

At the end remote from the former 150 the spindle is again reduced in diameter to fit into the bore of a tubular element 156 which is secured in an aperture in the end of a further flat resilient strip 157 corresponding to that employed at the opposite end of the spindle. These strips 152 and 157 (see for example, Figs. 10 and 11) are disposed radially with respect to the axis of the spindle 155 and have their outer ends secured on the upper face of the member 144 and on the lower face of the member 147, respectively. The mounting of the strips is effected with the aid of blocks of insulating material indicated generally at 158 so that the strips are electrically insulated from the members 144 and 147. Due to its method of mounting, the spindle 155 may move axially without any substantial movement in a direction transverse to its axis and a practically frictionless straight-line guidance for the former 150 is thus ensured.

A coil 159 of insulated wire is wound on the skirt portion of the former 150, the one end of the coil being connected electrically at 160 to the spindle 155 and the other end of the coil being electrically connected at 161 to the bush 151 forming part of the former. It will be seen that the coil is electrically connected between the strips 152 and 157, it being understood that the spindle 155 and the tubular element 156, and also the strips concerned, are of electrically conducting material. The electric signal to be utilised in the coil 159 is fed in by way of electric leads 162, 163 which are respectively connected, in a connector plug 164 (Fig. 11) to further leads 165 and 166 which are in turn connected to lateral extensions 152a and 157a formed on the respective resilient strips 152 and 157

On the upper face of the top member 144 of the pot-type magnet is secured a block 167 having a recess 168 centrally of its underside into which extends the upper end of the spindle assembly and the inner end of the strip 157. Centrally of this recess, there is formed a bore to receive a plug member 169 having a bore 170 formed axially thereof from its lower face, the mouth of this bore being flared to constitute a conical valve seating 171 with which co-operates a ball valve 172 which is supported by an abutment 173 of a non-conducting material, such as glass, which is firmly fixed in the upper end of the bore in the tubular element 156. Similarly, on the lower face of the bottom member 147 of the magnet structure there is secured a block 174 having a stepped recess 175 formed centrally of its upper face to receive with clearance the lower end of the coil former 150 and the downwardly projecting extension 151 thereof. Centrally of the base of the recess 175 there is formed a bore to accommodate a plug member 176 from the upper face of which is formed an axial bore 177 having its upper end flared to constitute a conical valve seating 178 with which co-operates a ball valve 179 contacted by an abutment member 180 of insulating material, for example, glass, which is firmly fixed in the lower end of the bore in the extension 151 on the coil former 150.

In the end face of the block 174 there are secured connectors for three pipes 181, 182 and 183, the first of which, 181, is adapted to supply compressed air to a horizontal bore 184 formed in the lower part of the block 174 parallel with one of the longer sides thereof. The inner end of the bore 184 communicates through a short transverse bore 185 with the lower end of a vertical bore 186 formed from the upper face of the block 174 and having its upper end enlarged to receive the lower end of a tube 187 which passes through an aperture in the bottom member 147 of the magnet structure and through an aperture in the top member 144 of this structure to have its upper end received in the enlarged lower end of a vertical bore 188 formed from the underface of the block 167. This bore 188 at its upper end opens into a horizontal bore 189 which leads to the bore in which the plug member 169 is fitted, this plug member having a radial bore 190 of much reduced cross-sectional area formed therein to establish communication between the bore 189 and the bore 170 formed in the plug.

There is also formed in the plug member 169 diametrically opposite to the bore 190 a further radial bore 191 adapted to establish communication between the axial bore 170 and a continuation 192 of the bore 189 which is plugged at its outer end as shown at 193. Intermediate the length of the bore 192, there opens thereinto a transverse bore 194 which, at its other end, communicates with the upper end of a vertical bore 195 formed from the lower face of the block 167 and having its lower end widened to receive the upper end of a tube 196 which passes through apertures in the top and bottom members 144 and 147 of the magnet structure to have its lower end received in the widened upper end of a bore 197 formed in the block 174 from the upper face thereof. The lower end of the bore 197 opens into a horizontal bore 198 which leads to the connector at which is attached the pipe 182.

Returning now to the plug member 176 in the lower block 174, it will be seen that this is formed with a radial bore 199 of restricted cross-sectional area which is adapted to establish communication between the axial bore 177 and a horizontal bore 200 which is formed in the block 174 to open into the lower end of the vertical bore 186. The plug member 176 is also formed with a radial bore 201 which is arranged to establish communication between the bore 177 and a further horizontal bore 202 which leads to the connector at which is attached the pipe 183.

Referring to Fig. 12, it will be seen that the tubular element 156 has secured therein the inner end of a radially extending rod 203 to the outer end of which is attached the lower end of a coil spring 204, the upper end of which is attached to a stud 205 secured approximately centrally of the length of an adjusting arm 206 which is pivoted at one end on a bolt 207 (Fig. 10), around which is disposed a mouse-trap-type spring 208 adapted to urge the arm 206 in the upward direction so that it will tend to extend the spring 204. The other or free end of the arm 206 is arranged to be engaged by an adjusting screw 209, rotation of which can be utilised to depress the arm 206 against the action of the spring 208. It will be appreciated that by this means the supporting force exerted by the spring 204 upon the spindle 155 may be adjusted, whereby the zero indication of the instrument may be correctly set.

The manner in which the apparatus illustrated in Figs. 9 to 12 is adapted to operate will be clearly understood from the foregoing description, it merely being necessary to state here that when the signal current is caused to flow through the coil 159 wound on the former 150 a proportional force is exerted upon the spindle 155 tending to move it axially and that this movement is assisted by the pressure acting upon one of the ball valves 172 or 179 and resisted by the pressure acting upon the other of the ball valves. It will be understood that an equilibrium position may be reached in which the difference between the pressures in the two pipes 182 and 183 is proportional to the value of the electric signal received. It should be noted that efficient damping is provided due to the former 150 being composed of high conductivity material.

With an arrangement as thus described, it is possible to utilise an electric signal of very low intensity to cause the production of a relatively large pressure difference for a certain rate of flow of the compressed air through the corresponding passages, the ratio between the power of the input signal and the power output being as high as 1:400. Moreover, the relationship between input signal and output pressure is of a linear character.

In a modification of the apparatus illustrated in Figs. 9 to 12, the spindle 155 may be of a magnetisable material and provided with an eccentric enlargement at each end so arranged that the magnetic flux through the spindle will produce a radial force acting upon the latter in the direction for tensioning the flexible strips 152 and 157 employed for supporting the spindle and coil arrangement. This modification is illustrated in Fig. 13 where the spindle 155 is shown provided with eccentric enlargements 155a disposed one adjacent each end thereof with the main mass of the metal in each enlargement disposed to that side of the axis of the spindle which is remote from the anchoring points for the strips 152 and 157.

In another example concerned with displacement-to-pressure conversion, which is particularly suitable for remote transmission, the mechanical linkage between the displaceable element and the abutment acting upon the ball valve may be replaced by an electrical linkage. An arrangement of this kind is illustrated in Fig. 14 as comprising a slide wire 210 fed through leads 211 from a constant voltage or constant current source indicated as a battery 212. Above the slide wire 210 is located a contact strip 213 between which and the slide wire is disposed a member 214 carrying electrically interconnected contacts 215 and 216 arranged respectively to wipe the slide wire 210 and the contact strip 213. Beneath the slide wire 210 is disposed a further contact strip 217 between which and the slide wire is disposed a normally stationary wiper 218 adapted to make contact between the contact strip 217 and an appropriate point on the slide wire 210. The contact strips 213 and 217 are connected by electric leads to the input leads 162 and 163 of an electric signal-to-pressure converter such as has been described with reference to Figs. 9 to 12 and is indicated generally by the reference 219 in Fig. 14. For the purpose of illustration, the output pipes 182 and 183 of this converter are shown as connected to the respective ends of the U-tube of a mercury manometer 220. The supply pipe to the converter is shown at 181.

In this arrangement the member 214 is connected mechanically to the displaceable element, the motion of which is to be represented as a proportional differential pressure and movements of the member cause signal currents of various intensities to be transmitted to the converter 219 in a manner which will be well understood. By reason of the provision of the wiper 218, it is possible for these currents to vary in sign and furthermore for the zero point of the complete apparatus to be readily adjusted.

The adjustment of the zero point in apparatus according to the invention, that is to say, the adjustment of the pressure or pressure difference which is produced for a zero value of the variable force may be effected, as has just been mentioned, by means for adjusting the position of the normally stationary wiper 218 in the case of the slide wire arrangement shown in Fig. 14 or it may be effected in the other forms of apparatus described by applying an adjusting force to the abutment which is adapted to act upon the ball valve or ball valves, for example, through the intermediary of a spring which may be tensioned to the required degree (see for example, Fig. 12). These adjustments of the zero point do not alter the slope of the input signal-output pressure characteristic but this slope may be altered if desired, by making provision for varying lever arm ratios in those constructions employing levers for applying the force to the ball or balls or by connecting resistances in series or in parallel with the coil of the electric signal-to-pressure converter.

It is to be understood that more than one arrangement in accordance with the invention may be provided and connected in cascade where much higher power amplifications are required. A similar result may be obtained by the use of "feed-back" arrangements. In the case of the cascade arrangement, any of the forms of the invention which have been described above may serve as the first stage according to the nature of the primary or input signal. The output pressures or pressure differences derived from the first stage may then be fed as secondary signals into a pressure-to-pressure converter, for example, of the bell-type referred to above. It is easily possible by utilising an electrical signal-to-pressure converter as a first stage with a bell-type pressure-to-pressure converter as a second stage to obtain power amplifications of the order of 1,000,000:1.

An example of a cascade arrangement such as has just been mentioned is illustrated in Fig. 15. In this arrangement, the electrical leads 221 supply the electrical signal to an electrical signal-to-pressure converter 222 constructed as described with reference to Figs. 9 to 12 and the output pressures in the pipes 182 and 183 derived from the input pressure in the pipe 181 are supplied to the interior spaces of the bells 223 and 224 of a bell-type pressure-to-pressure converter. These bells act upon opposite ends of a lever 225 which is pivoted at 226 on a fixed support and carries at opposite ends abutments 227 and 228 which act upon the respective ball valves 229 and 230 of two basic devices of the character described with reference to Fig. 1. These ball valves control outlet passages 231 and 232 from the respective chambers 233 and 234 which are in turn fed through the restricted passages 235 and 236 from a common supply 237 of compressed air. The outlet pipes 238 and 239 from the respective chambers 233 and 234 are shown, for illustration purposes only, as connected to the respective ends of the U-tube of a mercury manometer 240. The operation of this apparatus will be readily understood from the foregoing description.

Fig. 16 illustrates an example of a "feed-back" arrangement in which an electrical signal-to-pressure converter, which is diagrammatically indicated at 241, has its spindle 242 mechanically linked to the lever 243 of a pressure-to-pressure converter of the bell-type. The pressures in the respective output pipes 244 and 245 of the converter 241 is supplied beneath the bells 246 and 247 which are secured to the lever 243 at either side of the pivot 248 for the latter. The outlet pipes 244 and 245 are also continued beyond the branches which lead to the interiors of the bells to a point at which the differential pressures are to be utilised. It will be seen that with this arrangement, the bells are subjected to the pressures developed in the electric signal-to-pressure converter and that the corresponding forces on the bells are fed back to the spindle of the signal-to-pressure converter.

In another form of feed back arrangement a second force acting on the abutments controlling the ball valves is introduced in such a way that a linear or semi-linear relationship between abutment displacement and force is secured with a negative slope characteristic. For example, in the electric signal-to-pressure converter a strip of soft iron may be secured to the spindle to extend radially therefrom and two permanent magnets may be provided to act upon the strip in opposition in the sense for producing axial motion of the spindle. The arrangement is normally such that in the central position of the spindle the forces acting upon the strip due to the attractions of the permanent magnets will just balance. Consequently when the spindle and strip move away from the central position there is a resultant magnetic force tending to increase the original displacement. Similar effects can be obtained by using one magnet in combination with a spring or weight bias.

In the apparatus comprising pivoted levers carrying the abutments for the ball valves and adapted to have the force which is to be converted into a proportional pressure difference applied thereto, several examples of which have been described, the force has been considered to be variable in magnitude and applied to the lever at a constant distance from its fulcrum. It is also possible in certain applications to reduce a pressure having any one of a number of predetermined relationships to a force of substantially constant magnitude by utilizing what is in effect a pivoted lever and varying the position of the fulcrum of the lever in the manner required to produce the desired relationships. An example of an application of such an apparatus is in the proportioning of an output pressure to a given input pressure so that, depending upon the setting of a movable part in the apparatus, the relationship between the two pressures will have a desired value which will be maintained irrespective of small variations in the value of the input pressure. An example of an apparatus adapted for use in this application is illustrated in Figs. 17 to 23 and will now be described.

As shown, a rectangular block 249 is formed with a central screw-threaded bore 250 within which is secured a vertical pivot member 251 having an enlarged head 252 on its downwardly projecting end. A base plate 253 of the same dimensions as the block 249 is spaced from the lower face of the latter by a cylindrical wall 254, the base plate and the block being secured to each other by bolts 255 so that they will clamp the wall 254 between them. The pivot 251 extends axially into the cylindrical chamber thus provided and terminates short of the base plate 253 into which is secured the upper end of a spindle 256 which is rotatably received within a central hub 257 formed on a dial plate 258 having a depending peripheral skirt 259 and formed around the upper edge of the latter with a series of teeth 260. The spindle 256 projects below the hub 257 to have secured thereon by means of a grub screw 261 an abutment collar 262 between which and the underside of the dial plate 258 is disposed around the hub 257 a helical compression spring 263. Below the collar 262 the spindle 256 has rotatably mounted thereon a toothed segment 264 which is retained on the spindle by means of a nut and washer as shown. Secured upon the upper face of the segment 264 is a pointer 265, the upturned free end of which is disposed to co-operate with the skirt on the dial plate. The teeth of the segment 264 are in mesh with corresponding teeth on an adjusting element 266 which may be moved when desired in order to rotate the pointer 265 relative to the dial plate when small adjustments of the zero position of the instrument are required.

The block 249 is adapted to be fixed in position upon the rear face of a suitable panel (not shown) by means of screws or bolts entering the screw-threaded recesses 267 shown in Fig. 22, the portion of the dial plate in the immediate vicinity of the pointer 265 projecting through or being visible through an aperture formed in the panel and the adjusting element 266 being suitably mounted so that it may, when required, be moved in the one or other direction to cause slight rotational movement of the pointer 265 relative to the dial plate. On the upper face of the latter, there is formed an annular upstanding rib 268 adapted to contact the underside of the base plate 253 under the pressure of the spring 263. It will be appreciated that the dial plate is thereby held frictionally in position but may, nevertheless, be rotated relative to the base plate 253 and the spindle 256 when required, for example, by means of a toothed wheel meshing with the ring of teeth 260 on the dial plate. Alternatively, the ring of teeth may constitute knurling so that the dial plate may be rotated directly by hand. It will be understood that, although not shown, suitable calibrations will be marked on the skirt of the dial plate to co-operate with the pointer 265.

A sleeve 269 is rotatably mounted on the portion of the pivot 251 which projects into the cylindrical chamber bounded by the wall 254 and has fitted over its lower end the central boss 270 of a support member 271 which is of substantially T-shape in plan view and has the boss disposed in the shank portion adjacent to the cross-piece. The support member is secured to the sleeve, for example, by a ring or solder 272. Centrally of the width of the free end of the shank portion of the support member 271 there is secured a knife edge 273 and centrally of the width of the free outer edge of the cross-piece portion of the member there is secured a corresponding knife edge 274, the supporting edges of the knife edges being upwardly directed and located in the same horizontal plane as parts of a diameter passing through the axis of the pivot 251. Towards each end of the cross-piece portion of the support member 271, there is formed in the upper face a cylindrical recess 275 (see Fig. 18).

A plate 276 of a rigid material is shaped to present a substantially semi-circular portion joined at the centre of the length of its straight edge by a rectangular projection, the dimensions of the plate, which is completely flat, being such that it will fit within the wall 254 with a small but adequate clearance when engaged over the sleeve 269 by means of an aperture 277 formed in the plate concentric with the circle of which the arcuate edge of the plate 276 constitutes a part. There is a small clearance between the wall of the aperture 277 and the outer surface of the sleeve 269 so that the plate may rock slightly about an axis which coincides at one end with the medial line of the rectangular extension on the plate. On the underside of the plate there are secured two rectangular elements each formed on its underside with a V-section groove adapted to receive one of the knife edges 273, 274. The one rectangular element 278 is fixed to the central portion of the arcuate edge of the plate 276 so that the knife edge 273 may engage in the V-shaped groove 279 of this element whereas the other element 280 is fixed at the free end of the rectangular extension on the plate 276 so that the knife edge 274 may engage in the V-shaped groove 281 of this element. The cross-section of the grooves 279, 281, is such that the plate 276 may rock on the knife edges to a small extent. In order that the plate may not become accidentally dislodged from the knife edges it is formed at the appropriate locations with extensions 282 and 283 (see Fig. 21) which extend downwards, from the corresponding points on the plate, outside the knife edges and are then turned inwards under the latter.

Secured transversely of the rectangular projecting portion of the plate 276 is a cross-piece 284 the ends of which are located above the centres of the cylindrical recesses 275 formed in the cross-piece of the support member 271. On each end of the cross-piece 284 there is secured a disc 285 (see Fig. 23), which is of a diameter slightly smaller than the diameter of the corresponding recess 275 and it attached to the cross-piece by a short rod 286 which passes through an aperture formed in a cover plate 287 secured in position over the corresponding recess. As will be understood, the discs 285, in conjunction with the recesses 275, constitute air dash-pots.

The boss 270 of the support member 271 is formed with a radially extending arm 288 having its centre line set at an angle of 90° to the axis containing the knife edges 273, 274, and is formed from its free end with a slot 289, within which is engaged as a close sliding fit a pin 290 upstanding from about the centre of length of a lever 291 which at one end is pivoted on one of the bolts 255, suitable tubular distance pieces 292 and 293 being engaged over the bolt as shown in Fig. 20. In order to accommodate the movement of the lever 291 and to permit the mounting thereof on the appropriate bolt 255, the wall 254, is formed with an appropriately disposed slot 294 (see Figs. 18 and 20). The free end of the lever 291 is formed with a longitudinally directed slot 295 within which is engaged as a close fit a pin 296 which is secured at its lower end, as by a nut 297 (Fig. 17), in the dial plate 258 at a predetermined radial distance from the axis of the spindle 256. In order that the necessary rotation of the dial plate relative to the base plate 253 may be effected, the base plate is formed with an arcuate slot 298 through which the pin 296 extends. The proportions and dispositions of the arm 288 and lever 291 are such that there is a predetermined relationship between the motion of the dial plate and the consequent motion imparted to the support member 271 through the intermediary of the pins 296 and 290 and the lever 291 and arm 288. It will be seen upon considering Fig. 18 that for the position of the parts indicated, rotation of the dial plate 258 in the clockwise direction relative to the base plate 253 will cause the lever 291 to rock in the clockwise direction about its pivot 255 and thereby to move the pin 290 along the slot 289 in the arm 288 to impart a much reduced anti-clockwise rotation to the support member 271.

Returning now to the block 249 and referring more particularly to Figs. 17, 21 and 22, it will be seen that three connecting points for fluid pressure conveying pipes are provided along the face of the block which is opposite to that face in which are formed the mounting apertures 267. The first of these connecting points is marked 299 and is connected by way of a passage 300 to a transversely directed passage 301 which is plugged at its outer end as shown at 302 and at its inner end communicates with a vertically directed bore 303 formed from the underside of the block 249 and enlarged at its lower end to receive an axially bored plug 304 having a ball valve 305 engaged in its bore as a close sliding fit. The bore, as can be seen from Fig. 17, has a cylindrical wall. The spacing of the lower end of the plug 304 from the upper surface of the plate 276 is such that the ball normally rests upon this surface with its horizontally disposed great circle located just within the mouth of the bore in the plug. As can be seen from a comparison of Figs. 17, 19 and 22, the disposition of the ball 305 is closely adjacent to the pivot 251 as indicated by the dotted line position shown in Fig. 19.

The second of the connection points is marked 306 in Fig. 22 and is connected by way of a passage 307 into a transverse passage 308 which is closed at its outer end by a plug 309 and opens at its inner end into a passage 310 which in turn opens into a vertical bore 311 formed from the underside of the block 249. Within this bore is secured a tubular plug member 312, the bore 313 of which is flared at its lower end to constitute a conical seating 314 with which cooperates a ball valve 315. As in the case of the ball 305 the spacing of the lower end of the plug member 312 from the upper surface of the plate 276 is such that the ball 315 will rest on the said surface while its horizontal great circle is disposed approximately at the level of the mouth of the conical seating 314. Communication is established between the passage 310 and the axial bore 313 in the plug member 312 by way of a radial bore 316 formed in the plug member and having a restricted cross-sectional area. At a location opposite to the bore 316 the plug member is formed with another radial bore 317 which opens into a recess formed between a flat on the plug and the wall of the bore 311, this recess being in free communication with the third of the connection points referred to above, which is indicated by the reference 318.

In the operation of the apparatus illustrated in Figs. 17 to 23, a supply of gaseous pressure fluid is connected to the connection point 299 and therefore exerts through the ball 305 a certain force upon the plate 276, this force being strictly proportional to the value of the pressure of the fluid supplied at 299. Since, with the parts disposed in the positions in which they have been illustrated in the drawings, the ball 305 is located at a small distance from the axis about which the plate may tilt, there is a tendency for the forces exerted through the ball to tilt the plate.

At the connection point 306, there is supplied a gaseous fluid under pressure which may have any desired value in relation to the pressure of the fluid supplied at 299. This pressure is applied to the ball 315 which, in the initial position of the parts, is located substantially on the axis joining the knife edges 273, 274, as indicated by the dotted circle in Fig. 19. Since with the parts in the position shown, the ball 315 is held in sealing contact with the seating 314, the pressure supplied at 306 is fully available at the connection point 318. If, however, the support member 271 be rotated through a small angle about the axis of its pivot 251, it will be seen that the force exerted through the ball 315 upon the plate 276 will now have a certain moment. The force exerted upon the plate through the ball 305 also has a certain moment and it will be appreciated therefore that the plate 276 thus becomes in effect a lever with arms of unequal length and that a position of equilibrium will be reached in the manner already described in the foregoing so that the pressure available at the connection point 318 will now be in a ratio to the pressure supplied at the connection point 299 dependent on the ratio of the lengths of the lever arms i. e. the distances of balls 315 and 305 from the tilting axis represented by the knife edges 273 and 274. The ratio of the pressures can be varied by rotating the member 271 about its axis 251 by rotating the plate 258, the motion of which is transmitted by linkage 296, 295, 290, 289 to member 271. This linkage is preferably so dimensioned that the pressure ratios can be read on a logarithmic scale on the skirt 259 of the member 258. It will be clear, without further description, that by suitable calibration of the apparatus, it will be possible to ensure that the pressure available at the outlet 318 will bear a specified relationship to the pressure supplied at the inlet 299.

It will be appreciated that the tilting motions of the plate 276 are of relatively small magnitude and that the dash-pot arrangements carried on the cross-piece of the support member 271 will provide the necessary degree of positive damping to ensure that the apparatus will remain stable throughout its range of adjustment.

What I claim is:

1. A plurality of means each adapted to produce a fluid pressure proportional to the value of a variable input force and arranged in successive stages, means adapted to supply the proportional pressure produced in the lower of two successive stages to the higher of these two stages, and means associated with each stage above the lowest stage for converting the pressure supplied thereto into a proportional variable input force for that stage in which the means in each stage for converting the input force into a proportional pressure comprises a duct having a constricted outlet, a supply of fluid for maintaining a substantially constant pressure in said duct, a space containing fluid maintained at a pressure lower than said constant pressure, a chamber having an outlet to said space and supplied with fluid from said duct by way of said constricted outlet so that a pressure will be produced in said chamber which varies with the rate at which fluid escapes therefrom by way of the second-mentioned outlet, a coned valve seating disposed around the second-mentioned outlet, means for causing a force bearing a given ratio to the instant value of the variable force constantly to urge an element towards said seating, a ball interposed between said element and said seating and constantly urged away from the latter by the fluid escaping from the second-mentioned outlet, the sizes of the ball and the second-mentioned outlet being so determined in relation to said constant pressure that the maximum force capable of being exerted upon the ball by the escaping fluid is at least equal to the maximum value of the force urging said element towards said seating.

2. A plurality of converting means each adapted to produce a pressure difference proportional to, and of the same sign as, a variable input force capable of assuming both positive and negative values and each comprising a supply of fluid under substantially constant pressure, two chambers, two ducts each connected between the said supply and one of the chambers, a constriction in each duct through which the pressure fluid can pass to the respective chamber, a space surrounding the chambers and containing fluid maintained at a pressure lower than the supply pressure, an opening in each chamber for establishing communication between the chamber and the said space, a coned valve seating disposed around each such opening, a ball valve associated with each seating and urged away from the same under the action of pressure fluid escaping through the associated openings and means for applying the variable input force to the said balls in opposite senses so that it will urge the one ball into sealing contact with its associated coned seating while permitting the other ball to move away from its associated seating and vice versa, the sizes of the balls and the associated openings being so determined in relation to the supply pressure that the maximum force capable of being exerted upon any ball by the escaping fluid is at least equal to the maximum value of the variable input force, combined with means for utilising the proportional pressure difference produced in one such converting means for producing the variable input force for another such converting means whereby all the converting means are connected in cascade.

3. Means for operating a pressure responsive device in accordance with a pressure difference proportional to a variable input force capable of assuming both positive and negative values, comprising a supply of fluid under constant pressure, a first duct, a first constricted outlet connecting said first duct to said supply, a body of fluid maintained at a substantially constant pressure the magnitude of which is lower than that of the constant pressure of said supply, a first outlet establishing communication between said first duct and said body of fluid so that a fluid pressure will be produced in said first duct which varies with the rate at which fluid escapes by way of said outlet, a first coned valve seating disposed around said first outlet, a first element movable towards and away from said first seating, a first ball interposed between said first element and said first seating and constantly urged away from the latter by the fluid escaping from the first outlet, a second duct, a second constricted outlet connecting said second duct to said supply, a second outlet connecting said second duct to said body of fluid so that a fluid pressure will be produced in said second duct which varies with the rate at which fluid escapes by way of said second outlet, a second coned valve seating disposed around said second outlet, a second element movable towards and away from said second seating, a second ball interposed between said second element and said second seating and constantly urged away from the latter by the fluid escaping from said second outlet, and means for applying a force bearing a given ratio to the variable force simultaneously to said first element and to said second element so as to urge said first ball towards said first seating while permitting said second ball to move away from said second seating and vice versa, the variable pressure produced in said first duct and the variable pressure produced in said second duct being applied to said pressure responsive device.

4. Means according to claim 3, wherein a device is provided for applying positive damping to the force-applying means.

5. Means according to claim 3, wherein the force-applying means comprises an electro-magnetic device adapted to convert an electric signal into a proportional force.

6. Means according to claim 3, wherein the proportional pressure difference produced is caused to react upon the force-applying means in the sense to tend to vary the value of the pressure difference.

7. Means according to claim 3, wherein said first element and said second element are rigidly connected to each other.

8. Means for operating a pressure responsive device in accordance with a pressure difference proportional to the magnitude of an electric signal capable of assuming both positive and negative values, comprising a supply of fluid under constant pressure, a first duct, a first constricted outlet connecting said first duct to said supply, a body of fluid maintained at a substantially constant pressure the magnitude of which is lower than that of the constant pressure of said supply, a first outlet establishing communication between said first duct and said body of fluid so that a fluid pressure will be produced in said first duct which varies with the rate at which fluid escapes by way of said outlet, a first coned valve seating disposed around said first outlet, a first element movable towards and away from said first seating, a first ball interposed between said first element and said first seating and constantly urged away from the latter by the fluid escaping from the first outlet, a second duct, a second constricted outlet connecting said second duct to said supply, a second outlet connecting said second duct to said body of fluid so that a fluid pressure will be produced in said second duct which varies with the rate at which fluid escapes by way of said second outlet, a second coned valve seating disposed around said second outlet, a second element movable towards and away from said second seating, a second ball interposed between said second element and said second seating and constantly urged away from the latter by the fluid escaping from said second outlet, means for converting said variable electric signal into a force the magnitude of which is proportional to the magnitude of said signal and means for applying a force bearing a given ratio to said proportional force simultaneously to said first element and to said second element so as to urge said first ball into sealing contact with said first seating while permitting said second ball to move away from said second seating and vice versa, the variable pressure produced in said first duct and the variable pressure produced in said second duct being applied to said pressure responsive device.

9. Means for operating a pressure responsive device in accordance with a pressure difference proportional to the magnitude of an electric signal capable of assuming both positive and negative values, comprising a supply of fluid under constant pressure, a first duct, a first constricted outlet connecting said first duct to said supply, a body of fluid maintained at a substantially constant pressure the magnitude of which is lower than that of the constant pressure of said supply, a first outlet establishing communication between said first duct and said body of fluid so that a fluid pressure will be produced in said first duct which varies with the rate at which fluid escapes by way of said outlet, a first coned valve seating disposed around said first outlet, a first element movable towards and away from said first seating, a first ball interposed between said first element and said first seating and constantly urged away from the latter by the fluid escaping from the first outlet, a second duct, a second constricted outlet connecting said second duct to said supply, a second outlet connecting said second duct to said body of fluid so that a fluid pressure will be produced in said second duct which varies with the rate at which fluid escapes by way of said second outlet, a second coned valve seating disposed around said second outlet, a second element movable towards and away from said second seating, a second ball interposed between said second element and said second seating and constantly urged away from the latter by the fluid escaping from said second outlet, a connecting rod rigidly connecting said first element to said second element, means for converting said electric signal into a force the magnitude of which is proportional to the magnitude of said signal, and means for applying said force axially to said rod simultaneously to urge said first ball towards said first seating while permitting said second ball to move away from said second seating and vice versa, the variable pressure produced in said first duct and the variable pressure produced in said second duct being applied to said pressure responsive device.

10. Means for operating a pressure responsive device in accordance with a pressure difference proportional to the magnitude of an electric signal produced by a given source of such signal, said signal being capable of assuming both positive and negative polarities, comprising a supply of fluid under constant pressure, a first duct, a first constricted outlet connecting said first duct to said supply, a body of fluid maintained at a substantially constant pressure the magnitude of which is lower than that of the constant pressure of said supply, a first outlet establishing communication between said first duct and said body of fluid so that a fluid pressure will be produced in said first duct which varies with the rate at which fluid escapes from said outlet, said first outlet being arranged to direct said escaping fluid in a given direction, a first coned valve seating disposed around said first outlet, a first element movable towards and away from said first seating, a first ball interposed between said first element and said first seating and constantly urged away from the latter by the fluid escaping from the first outlet in said given direction, a second duct, a second constricted outlet connecting said second duct to said supply, a second outlet connecting said second duct to said body of fluid so that a fluid pressure will be produced in said second duct which varies with the rate at which fluid escapes by way of said second outlet, said second outlet being spaced from said first outlet in said given direction and being arranged to direct the fluid escaping therefrom in a direction coaxial with and opposite to said given direction, a second coned valve seating disposed around said second outlet, a second element movable towards and away from said second seating, a ball interposed between said second element and said second seating and constantly urged away from the latter by the fluid escaping from said second outlet in a direction coaxial with and opposite to said given direction, a connecting rod located between said first and second outlets coaxially with said given directions and rigidly connecting said first element to said second element, means for converting said signal into a force the magnitude of which is proportional to the magnitude of said signal, and means for applying said force axially to said rod simultaneously to urge said first ball towards said first seating while permitting said second ball to move away from said second seating and vice versa in accordance with the polarity of said signals, the variable pressure produced in said first duct and the variable pressure produced in said second duct being applied to said pressure responsive device.

11. Means according to claim 10 wherein said means for converting said signal into a force the magnitude of which is proportional to the magnitude of said signal and said means for applying said force to said rod comprise the combination of a tubular core of soft iron surrounding and coaxial with said rod, a disc-like top member coaxially arranged with respect to said rod and formed with a coaxial aperture into which one end of said core extends as a relatively close fit, a disc-like bottom member coaxially arranged with respect to said rod and formed with a coaxial aperture into which the other end of said core extends with clearance to provide an annular air-gap, said other end of the core constituting a pole-piece, an annular member of permanently magnetised material connecting said top member to said bottom member to form a complete circuit for the magnetic flux which traverses said annular air-gap, a former of a high conductivity metal rigidly secured to said rod, a skirt-portion on said former arranged to extend into said annular air-gap and a coil of insulated wire wound on said skirt-portion and connected electrically to said source of said signal such that passage of an electric signal through said coil will apply a force axially to said rod of a magnitude proportional to the magnitude of said signal and in a direction dependent upon the polarity of said signal.

12. A device for operating a pressure-sensitive device proportionally to the instant value of a variable force, comprising a casing having a chamber, said chamber having a constricted inlet, means for supplying gaseous fluid at substantially constant pressure to the end of said inlet remote from said chamber, said chamber having a first outlet adapted to be connected to a pressure-sensitive device, said chamber also having a second outlet having an outwardly flared outlet valve seat which is substantially frusto-conical in shape, said valve seat being adapted to communicate at its outer end with a second gaseous fluid maintained at a substantially constant pressure lower than said first-mentioned pressure, a ball valve positioned outwardly of said valve seat and positioned and movable relative to said seat so as to be movable between a first position in which it rests upon said seat and in which the fluid pressure within said chamber is at a maximum, and a second position in which it is remote from said seat and in which the fluid pressure within said chamber is at a minimum, and means for applying a variable force to said ball so as to urge it towards said valve seat, said variable force being variable within a range whereby for every value of said variable force said ball has a corresponding equilibrium position within the range between and including its first and second positions in which the variable force on said ball in addition to the force exerted thereon by said second fluid is balanced by the force exerted on said ball by said first fluid, the relation between the included angle of said valve seat, the diameter of said ball and the first and second fluid pressures being such that the ratio between the fluid pressure in said chamber and the balancing force on said ball is substantially constant for any equilibrium position of said ball.

13. A device in accordance with claim 12, in which the included angle of said valve seat is between 20° and 40°.

14. A device in accordance with claim 12, in which the included angle of said valve seat is approximately 30°.

GEORGE OLAH.

References Cited in the file of this patent
UNITED STATES PATENTS

| Number | Name | Date |
|---|---|---|
| 2,276,505 | Moore | Mar. 17, 1942 |
| 2,535,202 | Gregory | Dec. 26, 1950 |
| 2,536,813 | Jones | Jan. 2, 1951 |
| 2,563,374 | Rosenberger | Aug. 7, 1951 |